US012807797B2

(12) United States Patent
Gahleitner et al.

(10) Patent No.: US 12,807,797 B2

(45) **Date of Patent: *Nov. 24, 2026**

(54) HETEROPHASIC POLYPROPYLENE COMPOSITION WITH IMPROVED BALANCE OF PROPERTIES

(71) Applicant: BOREALIS AG, Vienna (AT)

(72) Inventors: Markus Gahleitner, Linz (AT); Jingbo Wang, Linz (AT); Klaus Bernreitner, Linz (AT); Simon Schwarzenberger, Linz (AT); Luigi Resconi, Linz (AT)

(73) Assignee: Borealis AG, Vienna (AT)

( * ) Notice: Subject to any disclaimer, the term of this patent is extended or adjusted under 35 U.S.C. 154(b) by 1081 days.

This patent is subject to a terminal disclaimer.

(21) Appl. No.: 16/973,673

(22) PCT Filed: Jul. 10, 2019

(86) PCT No.: PCT/EP2019/068486

§ 371 (c)(1),
(2) Date: Dec. 9, 2020

(87) PCT Pub. No.: WO2020/011825

PCT Pub. Date: Jan. 16, 2020

(65) Prior Publication Data

US 2021/0253836 A1 Aug. 19, 2021

(30) Foreign Application Priority Data

Jul. 13, 2018 (EP) .................................... 18183456

(51) Int. Cl.
*C08L 23/12* (2006.01)
*C08L 23/16* (2006.01)

(52) U.S. Cl.
CPC ............... *C08L 23/12* (2013.01); *C08L 23/16* (2013.01); *C08L 2201/10* (2013.01); *C08L 2205/03* (2013.01); *C08L 2205/24* (2013.01); *C08L 2207/02* (2013.01)

(58) Field of Classification Search
CPC .. C08L 23/12; C08L 2205/03; C08L 2207/02; C08L 25/10
See application file for complete search history.

(56) References Cited

U.S. PATENT DOCUMENTS

| | | | | |
|---|---|---|---|---|
| 6,437,063 | B1 * | 8/2002 | Karbasi | C08F 10/06 526/158 |
| 6,794,433 | B2 * | 9/2004 | Dotson | C08K 5/098 562/509 |
| 9,637,602 | B2 | 5/2017 | Potter et al. | |
| 9,650,504 | B2 | 5/2017 | Kastner et al. | |
| 9,670,293 | B2 | 6/2017 | Reznichenko et al. | |
| 9,670,347 | B2 | 6/2017 | Tölsch et al. | |
| 9,708,481 | B2 | 7/2017 | Wang et al. | |
| 9,745,431 | B2 | 8/2017 | Potter et al. | |
| 9,751,962 | B2 | 9/2017 | Wang et al. | |
| 9,777,142 | B2 | 10/2017 | Sandholzer et al. | |
| 9,802,394 | B2 | 10/2017 | Cavacas et al. | |
| 9,828,698 | B2 | 11/2017 | Wang et al. | |
| 9,890,275 | B2 | 2/2018 | Sandholzer et al. | |
| 9,976,020 | B2 | 5/2018 | Nummila-Pakarinen et al. | |
| 10,011,708 | B2 | 7/2018 | Lampela et al. | |
| 10,030,109 | B2 | 7/2018 | Boragno et al. | |
| 10,040,930 | B2 | 8/2018 | Gloger et al. | |
| 10,100,185 | B2 | 10/2018 | Wang et al. | |
| 10,100,186 | B2 | 10/2018 | Wang et al. | |
| 10,227,427 | B2 | 3/2019 | Reichelt et al. | |
| 10,450,451 | B2 | 10/2019 | Wang et al. | |
| 10,519,259 | B2 | 12/2019 | Resconi et al. | |
| 10,870,718 | B2 | 12/2020 | Denifl et al. | |
| 10,920,055 | B2 * | 2/2021 | Gahleitner | C08K 5/01 |
| 11,292,900 | B2 | 4/2022 | Gahleitner et al. | |
| 11,299,617 | B2 | 4/2022 | Preito et al. | |
| 11,390,732 | B2 | 7/2022 | Van Houcke et al. | |
| 11,407,886 | B2 * | 8/2022 | Toltsch | C08L 23/12 |
| 11,492,478 | B2 | 11/2022 | Kniesel et al. | |

(Continued)

FOREIGN PATENT DOCUMENTS

| | | | |
|---|---|---|---|
| CN | 102639309 | A | 8/2012 |
| EP | 2 053 086 | A1 | 4/2009 |

(Continued)

OTHER PUBLICATIONS

WO2018/077663 (Year: 2018).*
WO00/68315 (Year: 2000).*
Bloch, "Physical Constants of the Most Common Solvents for Polymers," *Polymer Handbook*, 4th Edition, Brandrup, J., Immergut, E. H., Eds., Wiley, New York, Section 3: Physical Properties of Monomers and Solvents, pp. 59-61 (1989).
Bloch, "Physical Properties of Monomers," *Polymer Handbook*, 4th Edition, Brandrup, J., Immergut, E. H., Eds., Wiley, New York, Section 3: Physical Properties of Monomers and Solvents, pp. 1-42 (1989).
Busico et al., "Alk-1-ene Polymerization in the Presence of a Monocyclopentadienyl Zirconium(IV) Acetamidinate Catalyst: Microstructural and Mechanistic Insightsa," *Macromol. Rapid Commun.* 28:1128-1134 (2007).
Busico et al., "Full Assignment of the $^{13}$C Nmr Spectra of Regioregular Polypropylenes: Methyl and Methylene Region," *Macromolecules* 30:6251-6263 (1997).

(Continued)

*Primary Examiner* — Irina Krylova

(74) *Attorney, Agent, or Firm* — Leydig, Voit & Mayer, Ltd.

(57) ABSTRACT

Disclosed is a heterophasic polypropylene composition having an improved balance of high stiffness, high toughness, and high transparency. The composition comprises 60.0 to 95.0 wt % of a crystalline propylene homopolymer with a melting temperature higher than 155 °C, 5.0 to 20.0 wt % of an elastomeric ethylene-propylene rubber, and at least one polymeric nucleating agent. Also disclosed is a process for the preparation of the heterophasic polypropylene composition comprising polymerizing propylene in at least three polymerization steps in the presence of a single-site catalyst. Further disclosed is an article obtained by extrusion of the heterophasic polypropylene composition. Also disclosed are extruded articles such as films.

12 Claims, No Drawings

(56) References Cited

U.S. PATENT DOCUMENTS

| | | | | |
|---|---|---|---|---|
| 11,504,949 | B2 | 11/2022 | Oderkerk et al. | |
| 11,518,863 | B2 | 12/2022 | Vijay | |
| 11,530,321 | B2 | 12/2022 | Kniesel et al. | |
| 2004/0158000 | A1* | 8/2004 | Yada | C08L 23/10 525/240 |
| 2004/0171782 | A1* | 9/2004 | Lin | C08F 110/06 526/170 |
| 2009/0118415 | A1* | 5/2009 | Aasetre | C08F 297/083 524/451 |
| 2009/0317615 | A1 | 12/2009 | Itakura et al. | |
| 2010/0249329 | A1* | 9/2010 | Grein | C08J 5/18 525/240 |
| 2011/0196078 | A1* | 8/2011 | Wolfschwenger | C08L 23/12 524/384 |
| 2013/0005902 | A1 | 1/2013 | Doshev et al. | |
| 2013/0203908 | A1* | 8/2013 | Kock | C08L 23/06 524/451 |
| 2015/0368449 | A1 | 12/2015 | Kastner et al. | |
| 2016/0185946 | A1 | 6/2016 | Sandholzer et al. | |
| 2016/0194486 | A1 | 7/2016 | Sandholzer et al. | |
| 2016/0200838 | A1 | 7/2016 | Reznichenko et al. | |
| 2016/0208085 | A1 | 7/2016 | Gloger et al. | |
| 2016/0229158 | A1 | 8/2016 | Cavacas et al. | |
| 2016/0237270 | A1 | 8/2016 | Wang et al. | |
| 2016/0244539 | A1 | 8/2016 | Resconi et al. | |
| 2016/0272740 | A1 | 9/2016 | Wang et al. | |
| 2016/0280899 | A1 | 9/2016 | Töltsch et al. | |
| 2016/0304681 | A1 | 10/2016 | Potter et al. | |
| 2016/0311951 | A1 | 10/2016 | Reichelt et al. | |
| 2016/0311988 | A1 | 10/2016 | Potter et al. | |
| 2016/0312018 | A1 | 10/2016 | Vestberg et al. | |
| 2016/0312019 | A1 | 10/2016 | Lampela et al. | |
| 2016/0347943 | A1 | 12/2016 | Wang et al. | |
| 2016/0347944 | A1 | 12/2016 | Wang et al. | |
| 2017/0009068 | A1 | 1/2017 | Kahlen et al. | |
| 2017/0029980 | A1 | 2/2017 | Wang et al. | |
| 2017/0137617 | A1* | 5/2017 | Wang | C08L 23/12 |
| 2017/0166711 | A1 | 6/2017 | Boragno et al. | |
| 2017/0218172 | A1 | 8/2017 | Wang et al. | |
| 2017/0313867 | A1 | 11/2017 | Lampela et al. | |
| 2017/0321048 | A1 | 11/2017 | Nummila-Pakarinen et al. | |
| 2018/0079875 | A1 | 3/2018 | Braun et al. | |
| 2018/0194881 | A1 | 7/2018 | Denifl et al. | |
| 2020/0263015 | A1 | 8/2020 | Kniesel et al. | |
| 2020/0270434 | A1 | 8/2020 | Van Houcke et al. | |
| 2020/0277479 | A1 | 9/2020 | Jerabek et al. | |
| 2020/0308353 | A1 | 10/2020 | Jerabek et al. | |
| 2020/0347216 | A1 | 11/2020 | Kniesel et al. | |
| 2020/0392321 | A1 | 12/2020 | Gahleitner et al. | |
| 2021/0114352 | A1 | 4/2021 | Oderkerk et al. | |
| 2021/0171749 | A1 | 6/2021 | Kumar et al. | |
| 2021/0171750 | A1 | 6/2021 | Gahleitner et al. | |
| 2021/0214527 | A1 | 7/2021 | Gahleitner et al. | |
| 2021/0214533 | A1 | 7/2021 | Kulshreshtha et al. | |
| 2021/0238376 | A1 | 8/2021 | Kahlen et al. | |
| 2021/0269560 | A1 | 9/2021 | Krallis et al. | |
| 2021/0324189 | A1 | 10/2021 | Prieto et al. | |
| 2021/0332227 | A1 | 10/2021 | Wang et al. | |
| 2021/0347971 | A1 | 11/2021 | Wang et al. | |
| 2022/0033631 | A1 | 2/2022 | Gloger et al. | |
| 2022/0135779 | A1 | 5/2022 | Wang et al. | |
| 2022/0204719 | A1 | 6/2022 | Vijay | |
| 2022/0227965 | A1 | 7/2022 | Ruemer et al. | |
| 2022/0251256 | A1 | 8/2022 | Wang et al. | |
| 2022/0289955 | A1 | 9/2022 | Kahlen et al. | |
| 2022/0306844 | A1 | 9/2022 | Kahlen et al. | |
| 2022/0315716 | A1 | 10/2022 | Prieto et al. | |
| 2022/0356330 | A1 | 11/2022 | Kahlen et al. | |
| 2023/0046086 | A1 | 2/2023 | Al-Haj Ali et al. | |
| 2023/0047329 | A1 | 2/2023 | Al-Haj Ali | |

FOREIGN PATENT DOCUMENTS

| | | | |
|---|---|---|---|
| EP | 2 631 269 | A1 | 8/2013 |
| EP | 3 263 641 | A1 | 1/2018 |
| RU | 2 588 568 | C2 | 7/2016 |
| TW | 200833761 | A | 8/2008 |
| WO | WO 2013/007650 | A1 | 1/2013 |
| WO | WO 2015/082403 | A1 | 6/2015 |
| WO | WO 2015/108634 | A1 | 7/2015 |
| WO | WO 2015/158790 | A2 | 10/2015 |
| WO | WO 2017/081018 | A1 | 5/2017 |
| WO | WO 2017/102935 | A1 | 6/2017 |
| WO | WO 2018/122134 | A1 | 7/2018 |

OTHER PUBLICATIONS

Busico et al., "Microstructure of polypropylene," *Prog. Polym. Sci.* 26:443-533 (2001).

Cheng, "$^{13}C$ NMR Analysis of Ethylene-Propylene Rubbers," *Macromolecules* 17:1950-1955 (1984).

Elias, "Isorefractive and Isopycnic Solvent Pairs," *Polymer Handbook*, $4^{th}$ Edition, Brandrup, J., Immergut, E. H., Eds., Wiley, New York, Section 3: Physical Properties of Monomers and Solvents, pp. 43-54 (1989).

Elias, "Refractive Indices of Common Solvents," *Polymer Handbook*, $4^{th}$ Edition, Brandrup, J., Immergut, E. H., Eds., Wiley, New York, Section 3: Physical Properties of Monomers and Solvents, pp. 55-58 (1989).

Gahleitner et al., "Crystallinity and Mechanical Properties of PP-Homopolymers as Influenced by Molecular Structure and Nucleation," *Journal of Applied Polymer Science* 61(4): 649-657 (1996).

Gahleitner et al., "Nucleation of Polypropylene Homo- and Copolymers," *International Polymer Processing* 26(1):2-20 (2011).

Kakugo et al., "$^{13}C$ Nmr Determination of Monomer Sequence Distribution in Ethylene-Propylene Copolymers Prepared with $\sigma$-$TiCl_3$-$Al(C_2H_5)_2Cl$," *Macromolecules* 15:1150-1152 (1982).

Monrabal et al., "Soluble Fraction Analysis in Propylene: Characterization of the whole polymer, amorphous and crystalline fractions in a Quality Control Laboratory," *Polymer Char*, The Column Advanstar Publications, 4 pgs. (2014).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}C$ NMR," *Polymer Testing* 28(5):475-479 (2009).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}C$ NMR," *J. Magnet. Reson.* 187:225-233 (2007).

European Patent Office, Extended European Search Report in European Patent Application No. 18183456.5 (dated Jan. 23, 2019).

European Patent Office, International Search Report in International Application No. PCT/EP2019/068486 (dated Sep. 10, 2019).

European Patent Office, Written Opinion in International Application No. PCT/EP2019/068486 (dated Sep. 10, 2019).

International Bureau of WIPO, International Preliminary Report on Patentability in International Application No. PCT/EP2019/068486 (dated Jan. 19, 2021).

Federal Institute of Industrial Property (FIPS), Request of the substantive examination in Russian Patent Application No. 2021100129/04(000205) (Mar. 30, 2021).

State Intellectual Property Office, First Office Action issued in Chinese Patent Application No. 201980040909.0 (dated Sep. 1, 2022).

Glikshtern, "Nucleating additives for polypropylene," *Polymer Materials* 6: 13-14 (2002).

(56) References Cited

OTHER PUBLICATIONS

Kulitchenko et al., “On the issue of nucleating pipe marks of propylene-ethylene copolymers,” *Polymer Pipes* 4(30): 33-35 (2010).
Intellectual Property India, Examination Report in Indian Patent Application No. 202117001980 (dated May 24, 2021).

* cited by examiner

HETEROPHASIC POLYPROPYLENE COMPOSITION WITH IMPROVED BALANCE OF PROPERTIES

CROSS-REFERENCE TO RELATED APPLICATIONS

This patent application is the U.S. national phase of International Application No. PCT/EP2019/068486, filed on Jul. 10, 2019, which claims the benefit of European Patent Application No. 18183456.5, filed Jul. 13, 2018.

The present invention is directed to a heterophasic polypropylene composition having an improved balance of desirable properties, i.e. high stiffness, high toughness, and high transparency. The present invention is further directed to a process for the preparation of the heterophasic polypropylene composition. The present invention is further directed to an article obtained by extrusion of the heterophasic polypropylene composition, and to a packaging article comprising the extruded article. Finally, the present invention is directed to the use of the heterophasic polypropylene composition for the production of extruded articles such as films or sheets.

Heterophasic polypropylene compositions are known in the art. They are composed of a continuous propylene homopolymer and/or propylene random copolymer phase acting as matrix in which an elastomeric phase, e.g. an ethylene-propylene rubber (EPR), is dispersed. Depending on the particular design of the heterophasic polypropylene composition various property profiles can be established. Factors of influence are the constitution of the matrix phase, the constitution of the dispersed phase, and the relative amounts thereof. As indicated already above, the matrix can be a propylene homopolymer and/or a propylene random copolymer. For the dispersed phase there are several options considering e.g. the type of monomer/comonomer, the amount of comonomer, and the molecular weight.

Heterophasic polypropylene compositions were designed to provide improved impact properties if compared to propylene random copolymers. The improved impact strength of heterophasic polypropylene compositions is attributed to the presence of the dispersed phase.

It is, however, a difficult task to provide a polypropylene composition with sufficient impact properties and good optical properties since light scattering occurs at the interface between the continuous matrix phase and the dispersed elastomeric phase. Accordingly, heterophasic polypropylene compositions appear somewhat opaque.

Also high stiffness is often desired. Given its high crystallinity, a propylene homopolymer (isotactic) has the highest stiffness. Insertion of a comonomer like in propylene ethylene random copolymers reduces stiffness by interrupting crystalline moieties but enhances impact properties. Insertion of a rubber phase resulting in a heterophasic polypropylene compositions further reduces stiffness but—as indicated already above—improves impact strength.

There is accordingly in general a conflict of aims if one wants at the same time provide a polypropylene composition with high stiffness, high impact strength (toughness), and good optical properties (high transparency).

Several attempts have been made to reduce light scattering at the interface and accordingly improve optical appearance. Similarly, several attempts have been made to balance or to tailor stiffness and impact strength.

EP 2 053 086 A1 discloses a propylene resin composition for packaging applications with excellent rigidity, transparency, impact resistance and blocking resistance. The propylene resin composition comprises a heterophasic propylene copolymer comprising a propylene polymer (A) having a melt flow rate $MFR_2$ of 0.1 to 40 g/10 min and a melting point of 145 to 170° C., and a propylene-ethylene copolymer (B) having an ethylene content of 15 to less than 45 mol %, an intrinsic viscosity of 1.9 to 3.5 dl/g, a molecular weight distribution of more than 3.5, and an n-decane soluble part of not less than 95 wt %.

WO 2015/108634 A1 discloses a polypropylene impact copolymer with improved elongation and impact strength but still acceptable stiffness. The polypropylene impact copolymer has a melt flow rate $MFR_2$ of 10 to 50 g/10 min and an elongation at break of greater than 60% and comprises a propylene homopolymer and 10 to 45 wt % of a propylene copolymer comprising 20 to 44 wt % ethylene, 1-butene, 1-hexene and/or 1-octene derived units.

There is, however, still a need for providing a polypropylene composition having an improved balance of desirable properties, i.e. high stiffness, high toughness, and high transparency.

The present invention is based on the finding that the object can be solved by provision of a heterophasic polypropylene composition produced in the presence of a single-site catalyst (SSC), the heterophasic polypropylene composition having particular limitations as regards the structure of the dispersed phase, and being nucleated by a polymeric nucleating agent.

Accordingly, the present invention is in one aspect directed to a heterophasic polypropylene composition (HECO) comprising a matrix phase (M) and an elastomeric phase dispersed therein, wherein the polypropylene composition comprises (A) 60.0 to 95.0 wt %, based on the total weight of the composition, of a crystalline propylene homopolymer (H-PP) with a melting temperature $T_m$ measured by differential scanning calorimetry (DSC) of more than 155° C., (B) 5.0 to 20.0 wt %, based on the total weight of the composition, of an elastomeric ethylene-propylene rubber (EPR), and (C) at least one polymeric nucleating agent, wherein the total sum of the components of the composition is 100 wt %, based on the total weight of the composition, wherein the crystalline propylene homopolymer (H-PP) and the elastomeric ethylene-propylene rubber (EPR) have been produced in the presence of a single-site catalyst (SSC), wherein the heterophasic polypropylene composition is characterized by a soluble fraction (SF) determined in 1,2,4-trichlorobenzene at 40° C. in the range of 5.0 to 20.0 wt %, based on the total weight of the composition, and wherein the soluble fraction (SF) has an ethylene content C2(SF) in the range of 12.0 to 40.0 wt %.

The expression propylene homopolymer used herein relates to a polypropylene that consists substantially, i.e. at least 99.0 wt %, preferably of at least 99.5 wt %, more preferably of at least 99.8 wt %, of propylene units. In a preferred embodiment only propylene is used as monomer in polymerization. In a preferred embodiment only propylene units are detectable in the propylene homopolymer. Further, it is appreciated that the homopolymer of propylene is a linear polypropylene.

Propylene Homopolymer (H-PP)

The propylene homopolymer (H-PP) is part of the matrix phase (M) of the heterophasic polypropylene composition.

Preferably, the matrix phase (M) comprises at least 90.0 wt %, more preferably at least 95.0 wt %, of the propylene homopolymer (H-PP). The matrix phase (M) may also consist of the propylene homopolymer (H-PP).

As indicated above, the amount of the propylene homopolymer (H-PP) in the heterophasic polypropylene composition (HECO) is 60.0 to 95.0 wt %. Preferably, the amount of the propylene homopolymer (H-PP) in the heterophasic polypropylene composition (HECO) is at least 70.0 wt %, more preferably at least 75.0 wt %, still more preferably at least 80.0 wt %, like at least 84.0 wt % or at least 88.0 wt %. Preferably, the amount of the propylene homopolymer (H-PP) in the heterophasic polypropylene composition (HECO) is 93.0 wt % or below, more preferably 92.0 wt % or below.

As indicated above, the melting temperature $T_m$ of the propylene homopolymer (H-PP) is higher than 155° C., preferably higher than 156° C., more preferably higher than 158° C., thereby indicating high crystallinity. The melting temperature $T_m$ of the propylene homopolymer (H-PP) will be usually not higher than 170° C.

The propylene homopolymer (H-PP) preferably has a melt flow rate $MFR_2$ of 2.5 to 300 g/10 min, more preferably of 4.0 to 200 g/10 min, still more preferably of 5.0 to 50 g/10 min.

As indicated above, the propylene homopolymer (H-PP) according to the present invention is produced in the presence of a single-site catalyst (SSC). Single-site catalysts (SSC) like metallocene catalysts are known to the skilled person. Suitable single-site catalysts (SSC) are e.g. disclosed in WO 2013/007650 A1 and in WO 2018/122134 A1.

The matrix phase (M) may comprise a further propylene homopolymer, e.g. a propylene homopolymer produced in the presence of a Ziegler-Natta catalyst, in an amount of 10.0 wt % or less, preferably 8.0 wt % or less, based on the total weight of the composition. For this further propylene homopolymer preferably the same limitations regarding melt flow rate $MFR_2$ and melting temperature apply.

Elastomeric Ethylene-Propylene Rubber (EPR)

The elastomeric ethylene-propylene rubber (EPR) is part of the elastomeric phase dispersed within the matrix phase (M). Preferably, the elastomeric phase comprises at least 80.0 wt %, more preferably at least 85.0 wt %, suitably at least 90.0 wt % or at least 95.0 wt %, of the elastomeric ethylene-propylene rubber (EPR). The elastomeric phase may also consist of the elastomeric ethylene-propylene rubber (EPR).

As indicated above, the amount of the elastomeric ethylene-propylene rubber (EPR) in the heterophasic polypropylene composition (HECO) is 5.0 to 20.0 wt %. Preferably, the amount of the elastomeric ethylene-propylene rubber (EPR) in the heterophasic polypropylene composition (HECO) is at least 7.0 wt %, more preferably at least 8.0 wt %. Preferably, the amount of the elastomeric ethylene-propylene rubber (EPR) in the heterophasic polypropylene composition (HECO) is 16.0 wt % or less, more preferably 14.0 wt % or less.

As indicated above, the elastomeric ethylene-propylene rubber (EPR) according to the present invention is produced in the presence of a single-site catalyst (SSC).

The elastomeric phase may comprise a further elastomeric ethylene-propylene rubber, e.g. an elastomeric ethylene-propylene rubber produced in the presence of a Ziegler-Natta catalyst, in an amount of 5.0 wt % or less, preferably 2.5 wt % or less, based on the total weight of the composition.

Nucleating Agent

As indicated above, the heterophasic polypropylene composition (HECO) according to the present invention comprises at least one polymeric nucleating agent.

Nucleating agents and in particular polymeric nucleating agents are known in the art. The skilled person accordingly knows suitable polymeric nucleating agents and knows suitable amounts to be added to a heterophasic polypropylene composition.

The amount of the at least one polymeric nucleating agent is preferably 0.0001 to 1.0 wt %, based on the total weight of the composition.

It is particularly preferred according to the present invention that the at least one polymeric nucleating agent comprises a polymer selected from vinylcycloalkane polymer, vinylalkane polymer, and mixtures thereof. Still more preferably, the at least one polymeric nucleating agent comprises, even more preferably consists of, vinylcyclohexane polymer. This is also known as polyvinylcyclohexane (PVCH).

Hence, a preferred polymeric nucleating agent according to the present invention is polyvinylcyclohexane (PVCH).

The heterophasic polypropylene composition (HECO) according to the present invention may comprise two nucleating agents, wherein one nucleating agent is a polymeric nucleating agent, preferably polyvinylcyclohexane (PVCH), and the second nucleating agent is not a polymeric nucleating agent. The second nucleating agent must be promoting the α-modification and/or the γ-modification of polypropylene, and is preferably a particulate nucleating agent. More preferably, the second nucleating agent is selected from the group consisting of salts of monocarboxylic acids and polycarboxylic acids, including dicarboxylic acids.

The amount of the second nucleating agent is preferably at least 0.01 wt %, more preferably at least 0.1 wt %, but not higher than 1.0 wt %, based on the total weight of the composition.

The total amount of all nucleating agents present is preferably 0.01 to 1.0 wt %, based on the total weight of the composition.

The at least one polymeric nucleating agent may be introduced either as a master batch by a compounding step subsequently to polymerization of the propylene homopolymer (H-PP) and the elastomeric ethylene-propylene rubber (EPR), or via a prepolymerization step prior to the first polymerization step wherein the polymeric nucleating agent is produced and a mixture of the single-site catalyst (SSC) and the polymeric nucleating agent is obtained. The polymerization of the propylene homopolymer (H-PP) and the elastomeric ethylene-propylene rubber (EPR) is then conducted in the presence of this mixture of the single-site catalyst (SSC) and the polymeric nucleating agent.

According to a preferred embodiment of the present invention, the polymeric nucleating agent is introduced together with 7.0 to 12.0 wt %, based on the total weight of the heterophasic polypropylene composition, of a Ziegler-Natta-based heterophasic polypropylene having a melting temperature $T_{m3}$ measured by differential scanning calorimetry (DSC) of higher than 155° C. and an $MFR_2$ (2.16 kg, 230° C.) measured according to ISO1133 in the range of 2.0 to 10.0 g/10 min.

Heterophasic Polypropylene

The heterophasic polypropylene is part of the heterophasic polypropylene composition (HECO) according to the present invention. The heterophasic polypropylene consists of the matrix phase (M) and of at least part of the elastomeric phase dispersed therein, wherein this part of the elastomeric phase consists of elastomeric ethylene-propylene rubber, i.e.

of the elastomeric ethylene-propylene rubber (EPR) which is produced in the presence of a single-site catalyst (SSC), and optionally of a further elastomeric ethylene-propylene rubber, e.g. an elastomeric ethylene-propylene rubber produced in the presence of a Ziegler-Natta catalyst.

The heterophasic polypropylene has a melt flow rate $MFR_2$ of preferably 2.0 to 10.0 g/10 min, more preferably of 2.2 to 8.0 g/10 min, still more preferably of 2.3 to 7.0 g/10 min.

The heterophasic polypropylene has an ethylene content of preferably 1.5 to 5.0 wt %, more preferably of 1.7 to 4.5 wt %, still more preferably of 1.9 to 4.0 wt %, based on the total weight of the composition.

Polyethylene or Plastomer

The heterophasic polypropylene composition (HECO) according to the present invention may comprise a polyethylene and/or a plastomer in an amount of up to 20.0 wt %, preferably up to 15.0 wt %, more preferably up to 12.0 wt %, based on the total weight of the composition. If present, the amount of the polyethylene and/or a plastomer is preferably at least 4.0 wt %, like at least 5.0 wt %, based on the total weight of the composition. Accordingly, preferred ranges are 4.0 to 20 wt %, preferably 5.0 to 15.0 wt %, based on the total weight of the composition.

If present, the polyethylene and/or the plastomer preferably has a density in the range of 890 to 925 kg/m$^3$, preferably of 900 to 920 kg/m$^3$.

Accordingly, suitable classes of polyethylene are low density polyethylene (LDPE), linear low density polyethylene (LLDPE) and very low density polyethylene (VLDPE). These classes are known to the skilled person.

Plastomers are ethylene or propylene based copolymers, like copolymers of ethylene with 1-octene, or copolymers of propylene with ethylene, preferably produced by polymerization with a single-site catalyst. Plastomers are known to the skilled person.

If present, the polyethylene and/or the plastomer preferably has and a melt flow rate $MFR_2$ (2.16 kg, 190° C.) measured according to ISO1133 in the range of 1.0 to 100 g/10 min, preferably of 1.2 to 80.0 g/10 min, more preferably of 1.3 to 70.0 g/10 min.

According to a preferred embodiment of the present invention, the polyethylene and/or plastomer is a linear low density polyethylene (LLDPE) which is present in an amount of 5.0 to 15.0 wt %, based on the total weight of the composition. In this regard it is furthermore preferred that the heterophasic polypropylene composition (HECO) has two melting temperatures $T_{m1}$ and $T_{m2}$ measured by differential scanning calorimetry (DSC) with $T_{m1}$ being higher than 155° C. and $T_{m2}$ being in the range of 60 to 125° C.

Heterophasic Polypropylene Composition (HECO)

The heterophasic polypropylene composition (HECO) comprises a matrix phase (M) and an elastomeric phase dispersed therein. As indicated above, the propylene homopolymer (H-PP) is part of the matrix phase (M), while the elastomeric ethylene-propylene rubber (EPR) is part of the elastomeric phase. The heterophasic polypropylene composition (HECO) further comprises at least one polymeric nucleating agent.

The heterophasic polypropylene composition (HECO) is preferably produced by sequential polymerization wherein in one step the propylene homopolymer (H-PP) is produced, and in a subsequent step the elastomeric ethylene-propylene rubber (EPR) is produced in the presence of the propylene homopolymer (H-PP). Accordingly, the elastomeric ethylene-propylene rubber (EPR), or the elastomeric fraction, respectively, is usually not present as a separate fraction.

Since in a heterophasic polypropylene composition the matrix phase and the elastomeric phase usually cannot exactly be divided from each other, one cannot directly measure amount and properties of the elastomeric ethylene-propylene rubber (EPR), or the elastomeric phase, respectively.

In order to characterize the matrix phase and the elastomeric phase of a heterophasic polypropylene composition several methods are known. One method is the extraction of a xylene cold solubles (XCS) fraction, thus separating a xylene cold solubles (XCS) fraction from a xylene cold insoluble (XCI) fraction. It is known that the xylene cold solubles (XCS) fraction of a heterophasic polypropylene composition largely corresponds to the elastomeric phase. It may, however, contain small parts of the matrix phase, e.g. around 1.0 wt %. The xylene extraction is especially suitable for heterophasic polypropylene compositions with a highly crystalline matrix phase such as propylene homopolymer matrix phase as in the present invention.

Another method is the separation of a crystalline fraction and a soluble fraction with the CRYSTEX QC method using 1,2,4-trichlorobenzene (TCB) as solvent. This method is described below in the measurement methods section. In this method, a crystalline fraction (CF) and a soluble fraction (SF) are separated from each other. The crystalline fraction (CF) largely corresponds to the matrix phase and contains only a small part of the elastomeric phase, while the soluble fraction (SF) largely corresponds to the elastomeric phase and contains only a small part of the matrix phase.

Due to the differences in the separation methods using extraction by xylene and by 1,2,4-trichlorobenzene, the properties of XCS/XCI fractions on the one hand and soluble/crystalline (SF/CF) fractions on the other hand are not exactly the same, but are similar.

As indicated above, the heterophasic polypropylene composition (HECO) is characterized by a soluble fraction (SF) determined in 1,2,4-trichlorobenzene at 40° C. in the range of 5.0 to 20.0 wt %, based on the total weight of the composition, and the soluble fraction (SF) has an ethylene content C2(SF) in the range of 12.0 to 40.0 wt %.

Preferably, the amount of the soluble fraction (SF) of the heterophasic polypropylene composition (HECO) is at least 7.0 wt %, more preferably at least 8.0 wt %.

Preferably, the amount of the soluble fraction (SF) of the heterophasic polypropylene composition (HECO) is 16.0 wt % or less, more preferably 14.0 wt % or less.

Preferably, the soluble fraction (SF) has an ethylene content C2(SF) of at least 14.0 wt %, more preferably of at least 15.0 wt %. Preferably, the soluble fraction (SF) has an ethylene content C2(SF) of 30.0 wt % or less, more preferably of 25.0 wt % or less.

Preferably, the intrinsic viscosity (IV) of the soluble fraction IV(SF) of the heterophasic polypropylene composition (HECO) is in the range of 1.0 to 3.0 dl/g, more preferably 1.2 to 2.5 dl/g, still more preferably 1.3 to 2.4 dl/g.

Correspondingly, the amount of the crystalline fraction (CF) of the heterophasic polypropylene composition (HECO) is in the range of 80.0 to 95.0 wt %, based on the total weight of the composition, preferably at least 84.0 wt %, more preferably at least 86.0 wt %. Preferably, the amount of the crystalline fraction (CF) of the heterophasic polypropylene composition (HECO) is 93.0 wt % or less, more preferably 92.0 wt % or less.

Preferably, the crystalline fraction (CF) has an ethylene content C2(CF) of 0.0 to 2.5 wt %, more preferably of 0.0 to 2.0 wt %, more preferably of 0.0 to 1.5 wt %.

Preferably, the ratio between the intrinsic viscosity (IV) of the soluble fraction IV(SF) and the intrinsic viscosity (IV) of the crystalline fraction IV(CF) is in the range of 0.5 to 1.2, more preferably 0.6 to 1.1, still more preferably 0.7 to 1.0.

The heterophasic polypropylene composition (HECO) according to the present invention is preferably also characterized by a xylene cold solubles (XCS) fraction in the range of 5.0 to 20.0 wt %, based on the total weight of the composition.

The heterophasic polypropylene composition (HECO) according to the present invention is preferably also characterized by an ethylene content of the xylene cold solubles (XCS) fraction C2(XCS) in the range of 12.0 to 40.0 wt %.

The heterophasic polypropylene composition (HECO) according to the present invention is preferably also characterized by an intrinsic viscosity (IV) measured according to DIN ISO1628/1 (in decalin at 135° C.) of the xylene cold solubles (XCS) fraction IV(XCS) in the range of 1.0 to 3.0 dl/g.

Preferably, the heterophasic polypropylene composition (HECO) according to the present invention has a melt flow rate $MFR_2$ (2.16 kg, 230° C.) measured according to ISO1133 in the range of 2.0 to 10.0 g/10 min, more preferably of 2.2 to 8.0 g/10 min, still more preferably of 2.3 to 7.0 g/10 min.

It is furthermore preferred that the heterophasic polypropylene composition (HECO) has at least one melting temperature $T_{m1}$ measured by differential scanning calorimetry (DSC) with $T_{m1}$ being higher than 155° C. The melting temperature $T_{m1}$ of the heterophasic polypropylene composition (HECO) will be usually not higher than 170° C. Still preferred ranges are 156 to 167° C. or 158 to 165° C.

In case the heterophasic polypropylene composition (HECO) according to the present invention comprises a linear low density polyethylene (LLDPE) which is present in an amount of 5.0 to 15.0 wt %, based on the total weight of the composition, it is furthermore preferred that the heterophasic polypropylene composition (HECO) has two melting temperatures $T_{m1}$ and $T_{m2}$ measured by differential scanning calorimetry (DSC) with $T_{m1}$ being higher than 155° C. and $T_{m2}$ being in the range of 60 to 125° C.

Preferably, the heterophasic polypropylene composition (HECO) according to the present invention has a glass transition temperature $T_g$(PP) in the range of −1.0 to 2.0° C. and a glass transition temperature $T_g$(EPR) in the range of −50.0 to −30.0° C.

The heterophasic polypropylene composition (HECO) according to the present invention has an improved balance of stiffness, toughness, and transparency.

Accordingly and preferably, the heterophasic polypropylene composition (HECO) according to the present invention has a haze measured according to ASTM D1033 on a 1.0 mm thick plaque of below 50%, more preferably in the range of 15 to 45%, still more preferably in the range of 17 to 40%.

Accordingly and preferably, the heterophasic polypropylene composition (HECO) according to the present invention has a Charpy notched impact strength NIS at +23° C. measured according to ISO 179 of at least 10.0 kJ/$m^2$, more preferably in the range of 14.0 to 75.0 kJ/$m^2$, still more preferably in the range of 16.5 to 70.0 kJ/$m^2$.

Accordingly and preferably, the heterophasic polypropylene composition (HECO) according to the present invention has a flexural modulus measured according to ISO 178 of at least 1300 MPa, like in the range of 1300 to 1700 MPa, more preferably in the range of 1350 to 1650 MPa.

Still more preferably, the heterophasic polypropylene composition (HECO) according to the present invention has a haze measured according to ASTM D1033 on a 1.0 mm thick plaque of below 50%, and a Charpy notched impact strength NIS at +23° C. measured according to ISO 179 of at least 10.0 kJ/$m^2$, and a flexural modulus measured according to ISO 178 of at least 1300 MPa.

The parameter OMA (opto-mechanical ability) is a measure of optical and mechanical performance. It is calculated as (flexural modulus/MPa×Charpy notched impact strength NIS at +23° C./kJ/$m^2$)/(haze/%). It is preferred according to the present invention that OMA is at least 500, preferably in the range of 550 to 2500, more preferably in the range of 600 to 2200.

The heterophasic polypropylene composition (HECO) according to the present invention may comprise usual additives, preferably in a total amount of not more than 5.0 wt % based on the total weight of the composition.

The heterophasic polypropylene composition (HECO) according to the present invention may comprise an antioxidant, such as sterically hindered phenol, phosphorus-based antioxidant, sulphur-based antioxidant, nitrogen-based antioxidant, or mixtures thereof. In particular, a mixture of pentaerythritol tetrakis(3-(3,5-di-tert-butyl-4-hydroxyphenyl)propionate) and tris(2,4-di-tert-butylphenyl) phosphite may be used as antioxidant (Irganox B 215 or Irganox B 225).

The heterophasic polypropylene composition (HECO) according to the present invention may further comprise an antistatic agent, such as calcium stearate, sodium stearate or zinc stearate.

Preparation of the Heterophasic Polypropylene Composition (HECO)

The present invention is in a second aspect directed to a process for the preparation of the heterophasic polypropylene composition (HECO) according to the first aspect of the present invention described above, including all its preferred embodiments.

This process comprises polymerizing propylene in at least three polymerization steps in the presence of a single-site catalyst (SSC), wherein a) in the first polymerization reactor (R1) propylene is polymerized to obtain a first propylene homopolymer fraction (H-PP1), said first propylene homopolymer fraction (H-PP1) is transferred to a second polymerization reactor (R2), b) in the second polymerization reactor (R2) a second propylene homopolymer fraction (H-PP2) is produced, forming together with the first propylene homopolymer fraction (H-PP1) the propylene homopolymer (H-PP), c) in the third polymerization reactor the elastomeric ethylene propylene rubber fraction (EPR) is produced in the presence of the propylene homopolymer (H-PP) which is produced in reaction steps a) and b), and d) the at least one polymeric nucleating agent is introduced either as a master batch by a compounding step subsequently to polymerization step c), or via a prepolymerization step prior to the first polymerization step a) in a prepolymerization reactor (PR) wherein the polymeric nucleating agent is produced and a mixture of the single-site catalyst (SSC) and the polymeric nucleating agent is obtained, and, subsequent to the the polymeric nucleating agent produced in the prepolymerization reactor (PR) is transferred to the first reactor (R1).

The process may comprise adding suitable additives by compounding.

Articles

The present invention is in a third aspect directed to an article obtained by extrusion of the heterophasic polypropylene composition (HECO) according to the first aspect of the present invention described above, including all its preferred embodiments.

Extrusion of a heterophasic polypropylene composition (HECO) according to the present invention is conventional for the skilled person. Suitable extruders like a twin screw extruder may be applied.

Preferred articles are films and sheets.

The present invention is in a fourth aspect directed to a packaging article comprising the extruded article according to the third of the present invention described above.

Use of the Heterophasic Polypropylene Copolymer Composition

The present invention is in a fifth aspect directed to the use of the heterophasic polypropylene copolymer composition (HECO) according to the first aspect of the present invention described above, including all its preferred embodiments, for the production of extruded articles such as films or sheets. It is further directed at packaging systems for food and medical products based on such films or sheets.

In the following, the present invention is further illustrated by means of examples.

EXAMPLES

1. Definitions/Measuring Methods

The following definitions of terms and determination methods apply for the above general description of the invention as well as to the below examples unless otherwise defined.

Ethylene Content

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^{1}H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

Density

Density is measured according to ISO 1183-1—method A (2004). Sample preparation is done by compression moulding in accordance with ISO 1872-2:2007.

Intrinsic Viscosity (IV)

Intrinsic viscosity (IV) is measured according to DIN ISO 1628/1, October 1999 in decalin at 135° C.

Melt Flow Rate

Melt flow rate $MFR_2$ of polyethylene is determined according to ISO 1133 at 190° C. under a load of 2.16 kg. Melt flow rate $MFR_2$ of polypropylene is determined according to ISO 1133 at 230° C. under a load of 2.16 kg.

Soluble and Crystalline Fraction (SF, CF)

The soluble fraction (SF) and the crystalline fraction (CF) of the composition as well as ethylene content and intrinsic viscosity of the respective fractions were analyzed by the CRYSTEX QC, Polymer Char (Valencia, Spain).

The crystalline and soluble fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the ethylene content in ethylene-propylene copolymers. IR4 detector is calibrated with series of 8 ethylene-propylene copolymers with known ethylene content in the range of 2 wt % to 69 wt % (determined by $^{13}$C-NMR) and various concentration between 2 and 13 mg/ml for each used ethylene-propylene copolymer used for calibration.

The amounts of the soluble fraction (SF) and the crystalline fraction (CF) are correlated through the XS calibration to the "xylene cold soluble" (XCS) quantity and respectively xylene cold insoluble (XCI) fractions, determined according to standard gravimetric method as per ISO16152. XS calibration is achieved by testing various ethylene-propylene copolymers with XS content in the range 2-31 wt %. The intrinsic viscosity (IV) of the parent ethylene-propylene copolymer and its soluble and crystalline fractions are determined with a use of an online 2-capillary viscometer and is correlated to corresponding IV's determined by standard method in decalin according to ISO 1628. Calibration is achieved with various ethylene-propylene copolymers with IV=2-4 dl/g.

A sample of the composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the TREF column filled with inert support (column filled with inert material e.g. glass beads) where the crystallization of the sample and separation of the soluble fraction from the crystalline part is taking place. This process is repeated two times. During the first injection the whole sample is measured at high temperature, determining the IV [dl/g] and the C2 [wt %] of the composition. During the second injection the soluble fraction (at low temperature) and the crystalline fraction (at high temperature) with the crystallization cycle are measured (wt % SF, wt % C2, IV).

(see Del Hierro, P.; Ortin, A.; Monrabal, B.; 'Soluble Fraction Analysis in polypropylene, The Column Advanstar Publications, February 2014. Pages 18-23).

Xylene Cold Solubles (XCS)

The xylene cold solubles content is measured at 25° C. according to ISO 16152, first edition; 2005-07-01. The part which remains insoluble is the xylene cold insoluble (XCI) fraction.

Glass Transition Temperature ($T_g$) and Storage Modulus (G')

The glass transition temperature $T_g$ and the storage modulus G'(23° C.) are determined by dynamic mechanical analysis (DMA) according to ISO 6721-7. The measurements are done in torsion mode on compression moulded samples (40×10×1.0 mm$^3$) between −100° C. and +150° C. with a heating rate of 2° C./min and a frequency of 1 Hz.

Melting and Crystallization Temperature ($T_m$, $T_c$), Melt Enthalpy ($H_m$)

Melting temperature ($T_m$), crystallization temperature ($T_c$), and melt enthalpy ($H_m$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an $H_m$-value of 209 J/g for a fully crystalline polypropylene (see Brandrup, J., Immergut, E. H., Eds. Polymer Handbook, 3rd ed. Wiley, New York, 1989; Chapter 3).

Charpy Notched Impact Strength

Charpy notched impact strength is determined according to ISO 179/1 eA at 23° C. and at −20° C. by using injection moulded test specimens as described in EN ISO 1873-2 (80×10×4 mm$^3$).

Flexural Modulus

Flexural modulus is determined according to ISO 178: 2010/Amd.1:2013 on injection molded specimens of prepared in accordance with ISO 294-1:1996 (80×10×4 mm$^3$).

Transparency, Haze and Clarity

Transparency, haze and clarity were determined according to ASTM D1003-00 on injection molded plaques prepared in accordance with EN ISO 1873-2 using a melt temperature of 200° C. (60×60×1.0 mm$^3$).

2. Examples

Preparation of Catalyst

Synthesis of Metallocene

The following reagents were used:

2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), $NiCl_2$ (DME) (Aldrich), dichlorodimethylsilane (Merck), $ZrCl_4$ (Merck), $HfCl_4$, <1% Zr (Strem Chemicals), trimethylborate (Acros), $Pd(OAc)_2$ (Aldrich), $NaBH_4$ (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), $K_2CO_3$ (Merck), 12 M HCl(Reachim), TsOH (Aldrich), $MgSO_4$ (Merck), $Na_2CO_3$ (Merck), $Na_2SO_4$ (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane for organometallic synthesis were distilled over sodium benzophenoneketyl. $CDCl_3$ (Deutero GmbH) and $CD_2Cl_2$ (Deutero GmbH) were dried over molecular sieves 4A. 4-Bromo-6-tert-butyl-5-methoxy-2-methylindan-1-one was obtained as described in WO 2013/007650.

Steps of Synthesis

2-methyl-4-(3,5-dimethylphenyl)-5-methoxy-6-tert-butyl-indan-1-one

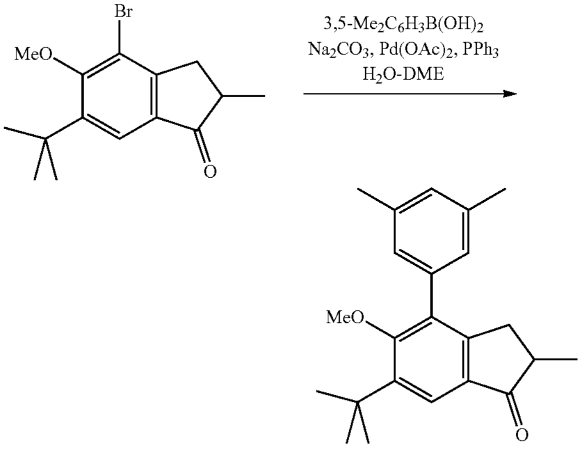

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of $Na_2CO_3$, 1.87 g (8.3 mmol, 5 mol %) of $Pd(OAc)_2$, 4.36 g (16.6 mmol, 10 mol %) of $PPh_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over $K_2CO_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for $C_{23}H_{28}O_2$: C, 82.10; H, 8.39. Found: C, 82.39; H, 8.52.

$^1H$ NMR ($CDCl_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H). $^{13}C\{^1H\}$ NMR ($CDCl_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

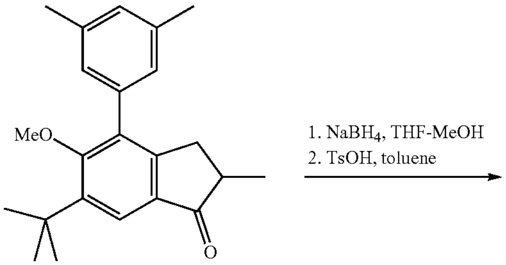

-continued

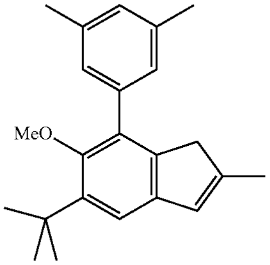

8.2 g (217 mmol) of $NaBH_4$ was added to a solution of 48.43 g (143.9 mmol) of 2-methyl-4-(3,5-dimethylphenyl)-5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% $Na_2CO_3$, the organic layer was separated, the aqueous layer was extracted with 150 ml of dichloromethane. The combined organic extract was dried over $K_2CO_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc. for $C_{23}H_{28}O$: C, 86.20; H, 8.81. Found: C, 86.29; H, 9.07.

$^1H$ NMR ($CDCl_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}C\{^1H\}$ NMR ($CDCl_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3,5-dimethylphenyl)-5-methoxy-6-tert-butyl-1H-inden-1-yl]chlorodimethylsilane

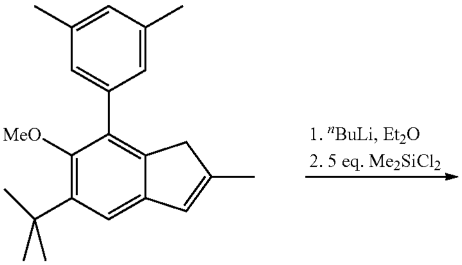

-continued

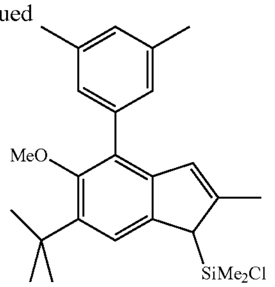

$^n$BuLi in hexanes (2.43 M, 25.2 ml, 61.24 mmol) was added in one portion to a solution of 19.66 g (61.35 mmol) of 2-methyl-5-tert-butyl-6-methoxy-7-(3,5-dimethylphenyl)-1H-indene in 300 ml of ether cooled to −50° C. The resulting mixture was stirred for 4 h at room temperature, then the resulting yellow suspension was cooled to −60° C., and 40.0 ml (42.8 g, 331.6 mmol, 5.4 eqv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-butyl-1H-inden-1-yl]chlorodimethylsilane as a slightly yellowish oil which was further used without an additional purification.

$^1$H NMR ($CDCl_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}C\{^1H\}$ NMR ($CDCl_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

1-methoxy-2-methyl-4-(3,5-Dimethylphenyl)-1,2,3,5,6,7-hexahydro-s-indacene

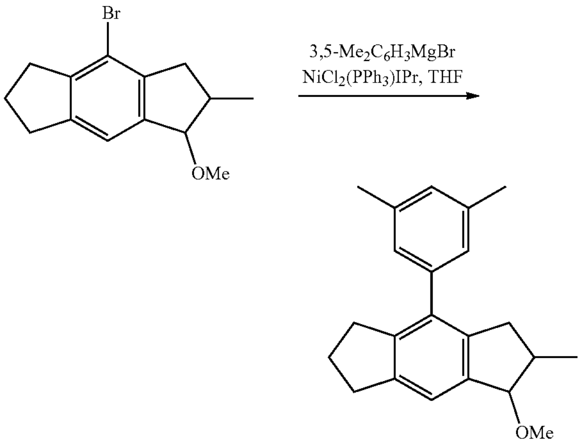

The precursor 4-bromo-1-methoxy-2-methyl-1,2,3,5,6,7-hexahydro-s-indacene was made according to the procedure described in WO2015/158790 A2 (pp 26-29).

To a mixture of 2.0 g (2.56 mmol, 1.8 mol %) of $NiCl_2(PPh_3)$IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 μm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

Anal. calc. for $C_{22}H_{26}O$: C, 86.23; H, 8.55. Found: C, 86.07; H, 8.82.

$^1$H NMR ($CDCl_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}C\{^1H\}$ NMR ($CDCl_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

4-(3,5-Dimethylphenyl)-6-methyl-1,2,3,5-tetrahydro-s-indacene

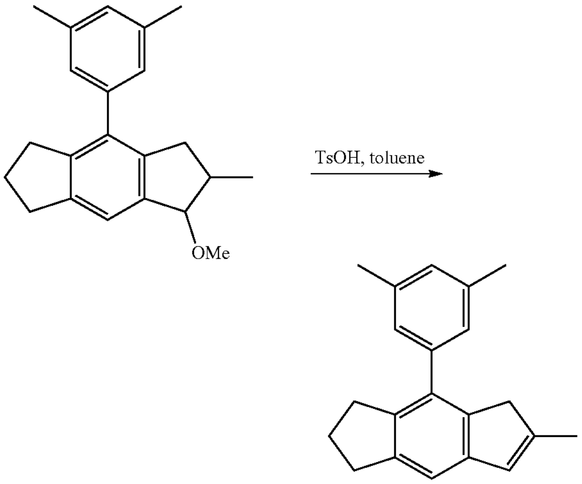

To the solution of 43.02 g (140.4 mmol) 1-methoxy-2-methyl-4-(3,5-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% $NaHCO_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 μm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

Anal. calc. for $C_{21}H_{22}$: C, 91.92; H, 8.08. Found: C, 91.78; H, 8.25.

$^1$H NMR ($CDCl_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}C\{^1H\}$ NMR ($CDCl_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

[2-methyl-4-(3,5-dimethylphenyl)-5-methoxy-6-tert-butyl-inden-1-yl][2-methyl-4-(3,5-dimethylphenyl)-1,5,6,7-tetrahydro-s-indacen-1-yl]dimethylsilane

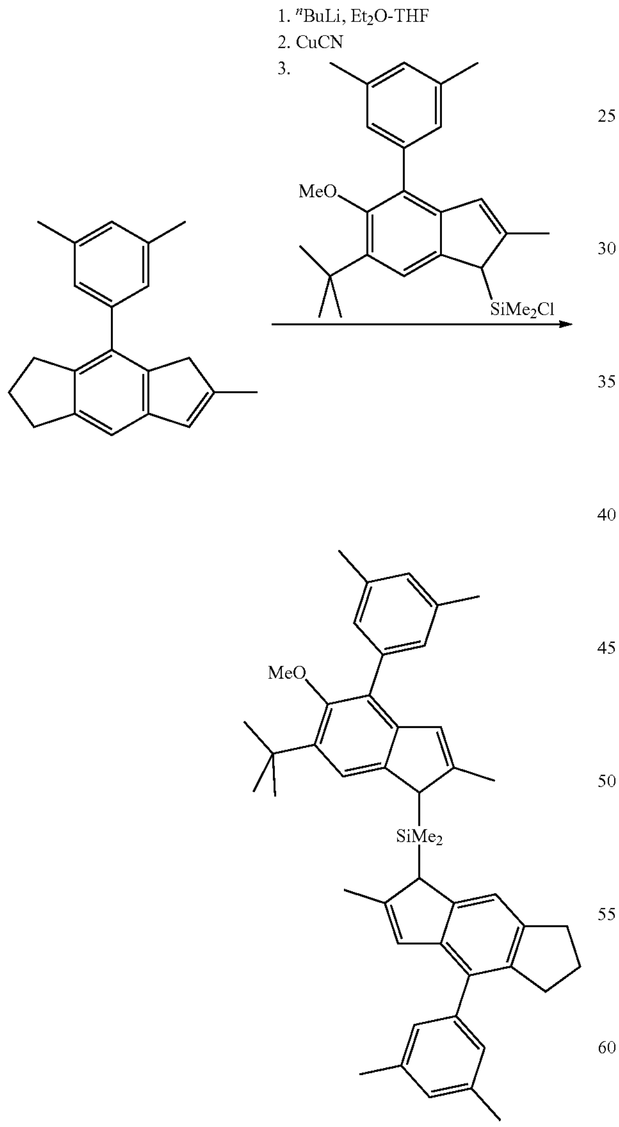

$^n$BuLi in hexanes (2.43 M, 25.2 ml, 61.24 mmol) was added in one portion to a solution of 16.83 g (61.33 mmol) of 4-(3,5-dimethylphenyl)-6-methyl-1,2,3,5-tetrahydro-s-indacene in a mixture of 300 ml of ether and 40 ml of THF, cooled to −50° C. This mixture was stirred overnight at room temperature, then the resulting reddish solution was cooled to −50° C., and 300 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl]chlorodimethylsilane (prepared above, ca. 61.24 mmol) in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the residue was dried in vacuum at elevated temperature. This procedure gave 39.22 g (98%) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (a ca. 3:2 mixture of stereoisomers) as a reddish glass.

$^1$H NMR ($CDCl_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum$^2$H), 3.69 and 3.65 (2s, sum$^2$H), 3.28 and 3.26 (2s, sum$^3$H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}C\{^1H\}$ NMR ($CDCl_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3,5-dimethylphenyl)-5-methoxy-6-tert-butyl-inden-1-yl][2-methyl-4-(3,5-dimethylphenyl)-1,5,6,7-tetrahydro-s-indacen-1-yl]hafnium dichloride

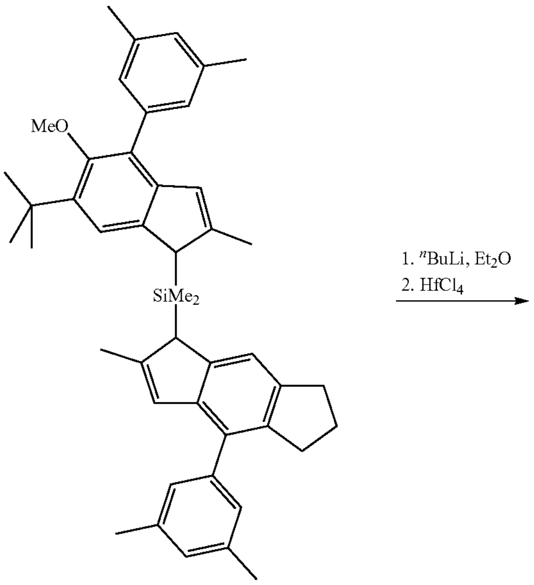

-continued

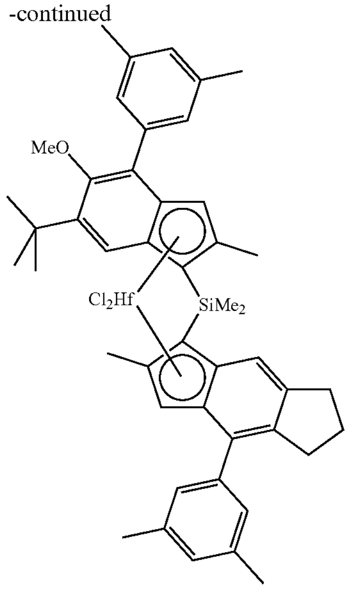

$^{n}$BuLi in hexanes (2.43 M, 49.6 ml, 120.5 mmol) was added in one portion to a solution of 39.22 g (60.25 mmol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 400 ml of ether, cooled to −50° C. This mixture was stirred overnight at room temperature. The resulting red solution was then cooled to −78° C., and 19.3 g (60.26 mmol) of HfCl4 was added. The reaction mixture was stirred for 24 h at room temperature to give an orange suspension. The precipitate was filtered off (G4), then washed with 30 ml of cold ether. On the evidence of NMR spectroscopy, this precipitate was pure syn-hafnocene dichloride (with LiCl), while the filtrate included a ca. 4/1 mixture of anti- and syn-hafnocene dichlorides (in favor to anti-) contaminated with some other impurities. The precipitate was dissolved in 150 ml of hot toluene, and the formed suspension was filtered to remove LiCl through glass frit (G4). The filtrate was evaporated to ca. 45 ml. Orange sold material precipitated overnight at room temperature was filtered off (G3) and then dried in vacuum. This procedure gave 8.1 g (15%) of pure syn-complex. The mother liquor was evaporated almost to dryness, and the residue was triturated with 20 ml of n-hexane to give 2.6 g (4.8%) of syn-hafnocene dichloride as an orange powder. The ether mother liquor was evaporated to ca. 60 ml, the precipitated yellow powder was filtered off (G4), washed with 20 ml of cold (0° C.) ether, and then dried under vacuum. This procedure gave 10.2 g (19%) of pure anti-hafnocene dichloride. Thus, the total yield of anti- and syn-hafnocene dichlorides isolated in this synthesis was 20.9 g (39%).

Anti-dimethylsilanediyl[2-methyl-4-(3,5-dimethylphenyl)-5-methoxy-6-tert-butyl-inden-1-yl][2-methyl-4-(3,5-dimethylphenyl)-1,5,6,7-tetrahydro-s-indacen-1-yl]hafnium dichloride Anal. calc. for $C_{46}H_{52}Cl_2OSiHf$: C, 61.50; H, 5.83. Found: C, 61.38; H, 6.15.

$^{1}$H NMR ($CDCl_3$): δ7.51 (s, 1H), 7.43 (s, 1H), 7.34-7.02 (br.m, 4H), 6.94 (s, 2H), 6.61 (s, 1H), 6.46 (s, 1H), 3.42 (s, 3H), 3.11-2.79 (m, 4H), 2.33 (s, 6H), 2.32 (s, 6H), 2.27 (s, 6H), 2.07-1.92 (m, 2H), 1.38 (s, 9H), 1.27 (s, 3H), 1.26 (s, 3H). $^{13}C\{^{1}H\}$ NMR ($CDCl_3$,): δ 159.55, 144.17, 143.58, 142.84, 138.38, 137.82, 137.57, 136.94, 133.09, 132.67, 132.40, 132.11, 131.23, 128.84, 128.76, 127.40, 126.88, 126.53, 124.97, 121.28, 120.84, 119.76, 119.71, 117.90, 82.92, 82.40, 62.62, 35.68, 33.11, 32.07, 30.43, 26.56, 21.46, 21.38, 18.26, 18.12, 2.63, 2.53.

Syn-dimethylsilanediyl[2-methyl-4-(3,5-dimethylphenyl)-5-methoxy-6-tert-butyl-inden-1-yl][2-methyl-4-(3,5-dimethylphenyl)-1,5,6,7-tetrahydro-s-indacen-1-yl]hafnium dichloride Anal. calc. for $C_{46}H_{52}Cl_2OSiHf$: C, 61.50; H, 5.83. Found: C, 61.59; H, 6.06.

$^{1}$H NMR ($CDCl_3$): δ 7.53 (s, 1H), 7.41 (s, 1H), 7.29-7.06 (m, 4H), 6.94 (s, 2H), 6.50 (s, 1H), 6.35 (s, 1H), 3.26 (s, 3H), 2.95-2.77 (m, 4H), 2.49 (s, 3H), 2.46 (s, 3H), 2.33 (2s, sum 12H), 1.99-1.86 (m, 1H), 1.86-1.73 (m, 1H), 1.40 (s, 3H), 1.37 (s, 9H), 1.18 (s, 3H). $^{13}C\{^{1}H\}$ NMR ($CDCl_3$,): δ 158.61, 143.03, 142.46, 142.16, 138.42, 137.73, 137.52, 136.98, 135.33, 134.60, 133.69, 132.53, 131.19, 128.79, 128.71, 127.34, 126.85, 126.00, 125.76, 121.95, 121.45, 119.12, 118.91, 118.55, 84.66, 84.26, 62.31, 35.48, 33.25, 31.94, 30.40, 26.60, 21.44, 18.44, 18.31, 2.93, 2.61

Metallocene Used in the Examples rac-anti-dimethylsilanediyl[2-methyl-4-(3',5'-dimethyl phenyl)-1,5,6,7-tetrahydro-s-indacen-1-yl][2-methyl-4-(3',5'-dimethylphenyl)-5-methoxy-6-tert-butylinden-1-yl]hafnium dichloride

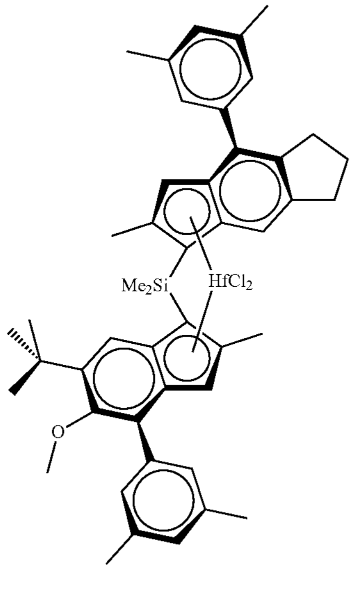

Preparation of Catalyst

The metallocene described above was used in preparing a catalyst.

The following reagents were used:

MAO was used as a 30 wt % solution in toluene. Trityl tetrakis(pentafluorophenyl)borate (Boulder Chemicals) was used as purchased. As surfactants were used perfluoroalkylethyl acrylate esters (CAS number 65605-70-1) purchased from the Cytonix corporation, dried over activated molecular sieves (2 times) and degassed by argon bubbling prior to use (S1) or 1H,1H-Perfluoro(2-methyl-3-oxahexan-1-ol) (CAS 26537-88-2) purchased from Unimatec, dried over activated molecular sieves (2 times) and degassed by argon bubbling prior to use (S2). Hexadecafluoro-1,3-dimethylyclohexane (PFC) (CAS number 335-27-3) was obtained from commercial sources and dried over activated molecular sieves (2 times) and degassed by argon bubbling prior to use. Propylene is provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas.

Inside the glovebox, surfactant S2 solution (28.8 mg of dry and degassed S2 dilute in 0.2 mL toluene) was added dropwise to 5 mL of 30 wt % Chemtura MAO. The solutions were left under stirring for 10 minutes. Then, 102.23 mg of the metallocene was added to MAO/surfactant. After 60 minutes, 104.9 mg of trityl tetrakis(pentafluorophenyl)borate was added. The mixture was left to react at room temperature inside the glovebox for 60 min. Then, the surfactant-MAO-metallocene-borate solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.67 g of a yellow free flowing powder was obtained.

Catalyst results are disclosed in Table 1.

TABLE 1

| ICP Al/ wt % | ICP Hf/ wt % | Al/Hf/ mol/mol | MC/ wt % |
|---|---|---|---|
| 31.4 | 1.19 | 174 | 6.0 |

Off-Line Prepolymerization ("Prepping") Procedure

The catalyst was pre-polymerized according to the following procedure: Off-line pre-polymerization experiment was done in a 125 mL pressure reactor equipped with gas-feeding lines and an overhead stirrer. Dry and degassed perfluoro-1,3-dimethylcyclohexane (15 $cm^3$) and 402.0 mg of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerisation was reached. The reaction was stopped by flashing the volatile components. Inside glove box, the reactor was opened and the content poured into a glass vessel. The perfluoro-1,3-dimethylcyclohexane was evaporated until a constant weight was obtained to yield 1.6670 g of the pre-polymerised catalyst with a pre-polymerization degree (g-pol/g-cat) of 3.62.

The pre-polymerization degree is defined as weight of polymer/weight of solid catalyst before pre-polymerization step.

Preparation of Heterophasic Polypropylene Copolymer SSC-HECO

The heterophasic polypropylene copolymer has been prepared by means of a 3-step polymerization (bulk homopolymerization+gas phase (GP1) homopolymerization+gas phase (GP2) $C_2/C_3$ copolymerization) in a 20-L reactor, as described below.

Step 1: Prepolymerization and Bulk Propylene Homopolymerization

A stirred autoclave (double helix stirrer) with a volume of 21.2 $dm^3$ containing 0.2 bar-g propylene, was filled with additional 3.97 kg propylene. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst was loaded into a 5-mL stainless steel vial inside the glovebox, the vial was attached to the autoclave, then a second 5-mL vial containing 4 ml n-hexane and pressurized with 10 bars of $N_2$ was added on top, the valve between the two vials was opened and the solid catalyst was contacted with hexane under $N_2$ pressure for 2 s, then flushed into the reactor with 250 g propylene. Stirring speed was increased to 250 rpm and pre-polymerization was run for 10 min at 20° C. At the end of the prepolymerization step, the stirring speed was increased to 350 rpm and the polymerization temperature increased to 80° C. When the internal reactor temperature reached 71° C., 1.5 Nl of $H_2$ was added with a defined flow via thermal mass flow controller. The reactor temperature was held constant throughout the polymerization. A polymerization time of 40 minutes starting when the temperature was 2° C. below the set polymerization temperature was used for this stage.

Step 2: Gas Phase: Propylene Homopolymerization (GP1)

After the bulk step was finished, the stirrer speed was adjusted to 50 rpm and the reactor pressure was reduced to 0.5 bar below the set pressure of 24 barg by venting. Then the stirrer speed was set to 250 rpm, the reactor temperature to 80° C. and 2.0 Nl of $H_2$ was dosed via MFC. Then the reactor P and T were held constant by propylene feed via MFC until the target split had been reached. Polymerization time for this stage was 40 minutes.

Step 3: Gas Phase: Ethylene/Propylene Copolymerization (GP2)

When the GP1 had been finished, the stirrer speed was reduced to 50 rpm. The reactor pressure was lowered to 0.3 barg by venting, the temperature and control device was set to 70° C. Then the reactor was filled with 200 g propylene at a flow of 70 g/min and flushed again to 0.3 barg.

Afterwards the stirrer speed was adjusted to 250 rpm. Then the reactor was filled with a $C_3/C_2$ monomer ratio (transition feed) of 0.64 mol/mol. The speed of the reactor filling during the transition was limited by the max. flow of the gas flow controllers. When the reactor temperature reached 85° C. and the reactor pressure reached the set value of 24 barg, the composition of the fed $C_3/C_2$ mixture was changed to the target copolymer composition of 0.39 mol/mol and temperature and pressure were held constant until the amount of $C_3/C_2$ gas mixture required to reach the target rubber split had been consumed. Polymerization time for this stage was 30 minutes.

The reaction was stopped by setting the stirrer speed to 20 rpm, cooling the reactor to 30° C. and flashing the volatile components.

After flushing the reactor twice with $N_2$ and one vacuum/$N_2$ cycle, the product was taken out and dried overnight in a fume hood. 100 g of the polymer was additivated with 0.2 wt % Ionol (2,6-Di-tert-butyl-4-methylphenol, CAS No. 128-37-0, commercially available from Oxiris Chemicals, Spain) and 0.1 wt % Irganox P-EPQ (Tetrakis-(2,4-di-t-butylphenyl)-4,4'-biphenylen-di-phosphonite, CAS No. 38613-77-3, commercially available from BASF AG, Germany), both antioxidants being dissolved in acetone, and then dried overnight in a hood plus 2 hours in a vacuum drying oven at 60° C.

Preparation of Heterophasic Polypropylene Composition

Compounding of the heterophasic polypropylene copolymer with a nucleating agent, if any, and further additives was carried out in line with Table 1 below.

Compounding of the compositions in Table 1 was implemented on ZSK 18 MEGAlab laboratory twin screw extruder under the following conditions: speed 200 rpm; melt temperature 175-190° C.; pressure 45-50 bar; output 5 kg/h.

The following materials and compounds are used in the Examples

AO Irganox B 215 commercially available from BASF SE

AS $Mg_{4.5}Al_2(OH)_{13}(CO_3)\ 3.5H_2O$, CAS-no. 11097-59-9, commercially available as Hycite 713 from BASF AG, Germany NU Ca salt of 1,2-cyclohexane dicarboxylic acid (1:1), CAS-no. 491589-22-1, commercially available as Hyperform HPN-20E from Milliken, USA, nucleating agent PVCH polyvinylcyclohexane, polymeric nucleating agent ZN-HECO Heterophasic propylene copolymer produced by a Ziegler-Natta catalyst, having an $MFR_2$ of 3.0 g/10 min (230° C., ISO 1133), a xylene cold soluble (XCS) fraction of 14 wt %, an ethylene content of 4.2 wt %, a flexural modulus of 1400 MPa (ISO 178), and a melting temperature of 168° C. (DSC), containing 15 ppm of polymeric nucleating agent, commercially available as BC918CF from Borealis AG, Austria.

LLDPE Bimodal terpolymer LLDPE having a density of 918 kg/$m^3$ (ASTM D792), an $MFR_2$ of 1.5 g/10 min (190° C., ASTM D1238), and a melting temperature of 122° C. (ISO 11357/03), commercially available as Anteo™FK1820 from Borouge Pte Ltd., UAE HOMO1 Propylene homopolymer produced by a Ziegler-Natta catalyst having an $MFR_2$ of 4 g/10 min (230° C., ISO 1133), a flexural modulus of 1700 MPa (ISO 178), and a melting temperature of 163° C. (DSC), containing 25 ppm of polymeric nucleating agent, commercially available as HC205TF from Borealis AG, Austria.

HOMO2 Propylene homopolymer produced by a Ziegler-Natta catalyst having an $MFR_2$ of 2 g/10 min (230° C., ISO 1133), a flexural modulus of 1700 MPa (ISO 178), and a density of 905 kg/$m^3$ (ISO 1183), commercially available as HB306MO from Borealis AG, Austria.

C3C2copo Semi-crystalline copolymer of propylene and ethylene produced with a metallocene catalyst with a predominantly amorphous ethylene propylene matrix (rubber) laced with a network of fine, well-dispersed isotactic polypropylene crystallites having an ethylene content of 16 wt %, an $MFR_2$ of 3 g/10 min (230° C.), and a density of 862 kg/$m^3$ (ASTM D1505), commercially available as Vistamaxx™ 6102 from ExxonMobil, USA.

INVENTIVE AND COMPARATIVE EXAMPLES

The compositions of the inventive and comparative examples and the respective properties thereof are indicated in Table 1 below.

Comparative Example 1, CE1, is based on the heterophasic polypropylene copolymer produced by a single-site catalyst as described above in detail, but does not contain any nucleating agent. The balance of stiffness and impact strength (NIS, notched impact strength) is rather good, however, the transparency as indicated by the haze value is not acceptable. Accordingly, OMA is only 176.

Inventive Example 1, IE1, is based on the same heterophasic polypropylene copolymer produced by a single-site catalyst but the composition in addition comprises a polymeric nucleating agent which is contained in the masterbatch ZN-HECO. Surprisingly, there is a significant increase of stiffness and impact strength and transparency. Accordingly, OMA is 751.

Stiffness and transparency can further be improved by adding a second (non-polymeric) nucleating agent NU as can be seen from Inventive Example 2, IE2. Accordingly, OMA is 1154.

The performance can be shifted to still considerably higher impact strength at still improved transparency while stiffness is only slightly reduced but remains in the same order of magnitude as can be seen from Inventive Example 3, IE3. Accordingly, OMA is 1733.

The solution of Comparative Example 2, CE2, is based on dual nucleation but the composition is based on Ziegler-Natta-based polymers. The comparison with IE2 shows very much lower impact strength and reduced transparency at only slightly higher stiffness. Accordingly, OMA is merely 362.

Comparative Example 3, CE3, is based on a Ziegler-Natta-based propylene homopolymer as matrix (nucleated) and on a metallocene-based elastomeric phase. Impact strength is reduced. Accordingly, OMA is merely 261.

If one compares the inventive examples with similar stiffness and same nucleation concept, i.e. IE1 and CE3, the transparency is on the same level but the impact strength is much higher in the example according to the invention.

TABLE 1

Compositions of examples and properties thereof

| | | IE1 | IE2 | IE3 | CE1 | CE2 | CE3 |
|---|---|---|---|---|---|---|---|
| SSC-HECO | wt % | 89.8 | 89.65 | 80.65 | 99.8 | | |
| AO | wt % | 0.15 | 0.15 | 0.15 | 0.15 | | |
| AS | wt % | 0.05 | 0.05 | 0.05 | 0.05 | | |
| NU | wt % | | 0.15 | 0.15 | | | |

TABLE 1-continued

Compositions of examples and properties thereof

| | | IE1 | IE2 | IE3 | CE1 | CE2 | CE3 |
|---|---|---|---|---|---|---|---|
| ZN-HECO | wt % | 10 | 10 | 9 | | 55 | |
| LLDPE | wt % | | | 10 | | | |
| HOMO1 | wt % | | | | | 45 | 57 |
| HOMO2 | wt % | | | | | | 38 |
| C3C2copo | wt % | | | | | | 5 |
| MFR | g/10 min | 2.7 | 2.7 | 2.5 | 2.5 | 3.3 | 3.3 |
| PVCH | ppm | 1.5 | 1.5 | 1.5 | 0 | 7.5 | 15 |
| NU | ppm | 125 | 1625 | 1625 | 0 | 650 | 0 |
| Haze | % | 37 | 26 | 24 | 55 | 34 | 34 |
| NIS/23° C. | $kJ/m^2$ | 19.7 | 19.9 | 30.1 | 7.6 | 7.6 | 5.9 |
| NIS/−20° C. | $kJ/m^2$ | 1.0 | 1.0 | 1.32 | 1.03 | 0.96 | 1.67 |
| Flexural mod. | MPa | 1421 | 1523 | 1387 | 1283 | 1597 | 1481 |
| OMA | — | 751 | 1154 | 1733 | 176 | 362 | 261 |
| SF | wt % | 11.8 | 11.8 | n.d. | 9.3 | 8.6 | 5.6 |
| C2 | wt % | 2.3 | 2.3 | n.d. | 2.3 | 2.7 | 1.9 |
| C2(SF) | wt % | 17.1 | 17.1 | n.d. | 17.4 | 22.6 | 12.6 |
| C2(CF) | wt % | 1.3 | 1.3 | n.d. | 1.1 | 1.4 | 1.6 |
| IV | dl/g | 2.34 | 2.34 | n.d. | 2.31 | 2.38 | 2.4 |
| IV(SF) | dl/g | 1.9 | 1.9 | n.d. | 1.7 | 1.8 | 1.4 |
| IV(CF) | dl/g | 2.3 | 2.3 | n.d. | 2.3 | 2.4 | 2.4 |
| IV(SF)/IV(CF) | | 0.80 | 0.80 | n.d. | 0.72 | 0.74 | 0.60 |
| G' | MPa | 765 | 788 | 698 | 737 | 815 | 901 |
| $T_{g1}$ | ° C. | −0.1 | 0.2 | 1.0 | −0.2 | 0.7 | 0 |
| $T_{g2}$ | ° C. | −40.6 | −40.7 | −38.7 | −39.6 | −40.7 | −36 |
| $T_{c1}$ | ° C. | 126 | 127 | 126 | 121 | 128 | 127 |
| $T_{c2}$ | ° C. | | | 111 | | | |
| $T_{m1}$ | ° C. | 161 | 162 | 161 | 160 | 166 | 163 |
| $T_{m2}$ | ° C. | | | 123 | | | |
| $H_{m1}$ | J/g | 100 | 101 | 79 | 98 | 105 | 105 |
| $H_{m2}$ | J/g | | | 20.1 | | | |

The invention claimed is:

1. A heterophasic polypropylene composition (HECO) comprising a matrix phase (M) and an elastomeric phase dispersed therein, wherein the polypropylene composition comprises component (A) 60.0 to 93.0 wt %, based on the total weight of the composition, of a crystalline propylene homopolymer (H-PP) with a melting temperature $T_m$ measured by differential scanning calorimetry (DSC) of more than 158 °C, component (B) 5.0 to 20.0 wt %, based on the total weight of the composition, of an elastomeric ethylene-propylene rubber (EPR), and component (C) at least one polymeric nucleating agent, wherein the total sum of the components of the composition is 100 wt %, based on the total weight of the composition, wherein the crystalline propylene homopolymer (H-PP) and the elastomeric ethylene-propylene rubber (EPR) have been produced in the presence of a single-site catalyst (SSC), wherein the heterophasic polypropylene composition contains a soluble fraction (SF) determined in 1,2,4-trichlorobenzene at 40 °C in the range of 5.0 to 20.0 wt %, based on the total weight of the composition, and wherein the soluble fraction (SF) has an ethylene content C2 (SF) in the range of 12.0 to 40.0 wt %, and wherein the at least one polymeric nucleating agent is introduced as a master batch together with 7.0 to 12.0 wt %, based on the total weight of the composition, of a Ziegler-Natta-based heterophasic polypropylene having a melting temperature $T_m$³ measured by differential scanning calorimetry (DSC) of higher than 155 °C and an MFR2 (2.16 kg, 230 °C) measured according to ISO 1133 in the range of 2.0 to 10.0 g/10 min, and wherein the heterophasic polypropylene composition (HECO) has a haze measured according to ASTM D1033 on a 1.0 mm thick plaque of 15% to below 40%, a Charpy notched impact strength NIS at +23 °C measured according to ISO 179 of 15-75 KJ/m2, a flexural modulus measured according to ISO 178 of 1300-1700 MPa, and an opto-mechanical ability (OMA) of 500-2500, wherein the OMA is calculated as (flexural modulus/MPa × Charpy notched impact strength NIS at +23 °C/KJ/$m^2$)/(haze/%).

2. The heterophasic polypropylene composition (HECO) according to claim 1, which has an $MFR_2$ (2.16 kg, 230 °C) measured according to ISO1133 in the range of 2.0 to 10.0 g/10 min.

3. The heterophasic polypropylene composition (HECO) according to claim 1, wherein an intrinsic viscosity (IV) of the soluble fraction IV (SF) of the heterophasic polypropylene composition (HECO) is in the range of 1.0 to 3.0 dl/g.

4. The heterophasic polypropylene composition (HECO) according to claim 1, wherein a ratio between the intrinsic viscosity (IV) of the soluble fraction IV (SF) and the intrinsic viscosity (IV) of a crystalline fraction IV (CF) is in the range of 0.5 to 1.2.

5. The heterophasic polypropylene composition (HECO) according to claim 1, wherein the amount of the at least one polymeric nucleating agent is 0.0001 to 1.0 wt %, based on the total weight of the composition.

6. The heterophasic polypropylene composition (HECO) according to claim 1, wherein the heterophasic polypropylene composition (HECO) comprises two nucleating agents, wherein the first nucleating agent is a polyvinylcyclohexane (PVCH) and the second nucleating agent is selected from the group consisting of salts of monocarboxylic acids and polycarboxylic acids.

7. The heterophasic polypropylene composition (HECO) according to claim 1, further comprising a polyethylene and/or a plastomer in an amount of 4.0 to 20.0 wt %, based on the total weight of the composition.

8. The heterophasic polypropylene composition (HECO) according to claim 7, wherein the polyethylene and/or the plastomer has a density in the range of 890 to 925 kg/$m^3$ and an $MFR_2$ (2.16 kg, 190 °C) measured according to ISO1133 in the range of 1.0 to 100 g/10 min.

9. The heterophasic polypropylene composition (HECO) according to claim 7, wherein the polyethylene and/or plastomer is a linear low density polyethylene (LLDPE) which is present in an amount of 5.0 to 15.0 wt %, based on the total weight of the composition, wherein the heterophasic polypropylene composition has two melting temperatures $T_{m1}$ and $T_{m2}$ measured by differential scanning calorimetry (DSC) wherein $T_{m1}$ is higher than 155 °C and $T_{m2}$ is in the range of 60 to 125 °C.

10. A process for the preparation of the heterophasic polypropylene composition (HECO) according to claim 1, comprising polymerizing propylene in at least three polymerization steps in the presence of the single-site catalyst (SSC), wherein a) in the first polymerization reactor (R1) propylene is polymerized to obtain a first propylene homopolymer fraction (H-PP1), said first propylene homopolymer fraction (H-PP1) is transferred to a second polymerization reactor (R2), b) in the second polymerization reactor (R2) a second propylene homopolymer fraction (H-PP2) is produced, forming together with the first propylene homopolymer fraction (H-PP1) the propylene homopolymer (H-PP), c) in the third polymerization reactor the elastomeric ethylene propylene rubber fraction (EPR) is produced in the presence of the propylene homopolymer (H-PP) which is produced in the reaction steps a) and b), and d) the at least one polymeric nucleating agent is introduced as the master batch by a compounding step subsequently to the polymerization step c).

11. An article obtained by extrusion of the heterophasic polypropylene composition (HECO) according to claim 1.

12. The article of claim 11, which is a packaging article.

* * * * *